Figure 1:
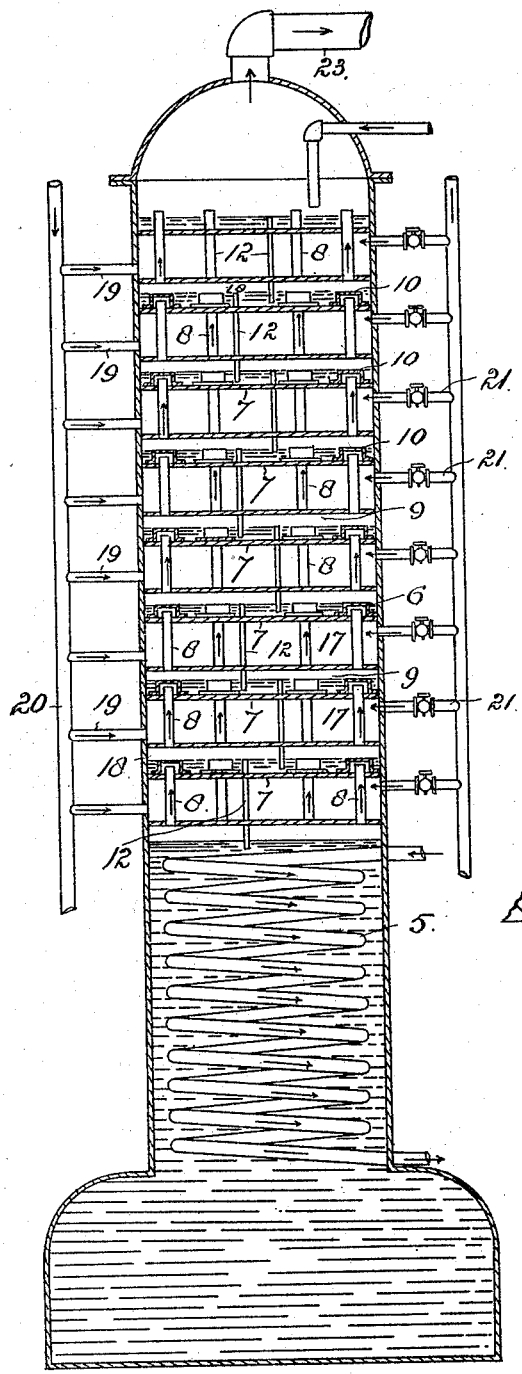

(No Model.)

G. L. VAIL & T. CHARLTON.
PROCESS OF PURIFYING AMMONIA GAS.

No. 505,427. Patented Sept. 19, 1893.

WITNESSES:
INVENTORS
ATTORNEY.

UNITED STATES PATENT OFFICE.

GEORGE L. VAIL AND THOMAS CHARLTON, OF DENVER, COLORADO.

PROCESS OF PURIFYING AMMONIA-GAS.

SPECIFICATION forming part of Letters Patent No. 505,427, dated September 19, 1893.

Application filed March 20, 1893. Serial No. 466,770. (No specimens.)

*To all whom it may concern:*

Be it known that we, GEORGE L. VAIL and THOMAS CHARLTON, citizens of the United States of America, residing at Denver, in the county of Arapahoe and State of Colorado, have invented certain new and useful Improvements in Processes of Purifying Ammonia-Gas; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to an improved process for producing ammonia gas for refrigerating and freezing purposes. By the processes heretofore employed, an inferior quality of gas has been produced. This inferiority is owing to the fact that the gas generated is laden with a considerable amount of moisture and other impurities, as hydrocarbons. Hence the object of our invention is to condense this moisture as well as the other condensible impurities and produce a gas dry and pure, whereby its efficiency for the purposes stated is greatly increased. To accomplish this object we discharge the aqua-ammonia while cold, into the generating tank, by passing it first through an analyzer containing a series of pans of such construction that each pan retains a quantity of the cold liquid before the liquid overflows into the pan next below, while the gas generated in the liquid containing tank is made to pass through the liquid in the pans, which liquid being cold condenses the moisture in the gas, which is thereby rendered dry and pure. The aqua ammonia through which the gas passes must contain such a per cent. of ammonia gas or be of such a strength that it has practically or approximately reached the limit of gas absorption, in order that there may be no appreciable loss or absorption of the gas during the process of purification. In practice the cold liquid entering the top of the still and retained in the pans of the analyzer has a strength of about twenty-six per cent. to twenty-eight per cent. Baumé and contains, therefore, about twenty-nine per cent. to thirty-two per cent. of ammonia gas by weight. This liquid enters the still at a temperature of 56° Fahrenheit, ordinarily. The aqua ammonia in the still is subjected to a pressure of from one hundred and thirty-five pounds to one hundred and eighty pounds to the square inch. Under this pressure the ammonia gas vaporizes at a temperature of from 266° to 269° Fahrenheit, while the water in the liquid will not boil under a temperature of 354° Fahrenheit, or thereabout. The liquid is heated in the generating tank by passing steam through the coils therein, to a temperature sufficient to vaporize the ammonia without boiling the water. By this method the vaporization is chiefly confined to the ammonia, the gas of which, however, is accompanied by more or less moisture which is carried over with the gas mechanically by what is known as "priming." This moisture together with the liquid hydro carbons we propose to eliminate from the ammonia gas in the manner heretofore stated. The gas generated in the still is under the pressure heretofore stated during the whole time it is passing through the still and the pipes of the freezing or refrigerating chamber; hence it liquefies without further pressure after leaving the still upon a reduction of its temperature to about 68° Fahrenheit, thus rendering quite unnecessary all forms of compressing machinery ordinarily used for that purpose. The temperature and pressure in the still are so adjusted that the ammonia gas cannot liquefy within the still itself but only upon its removal therefrom.

In the accompanying drawings we have shown a suitable apparatus for carrying out, or practicing our improved process.

Figure 2:
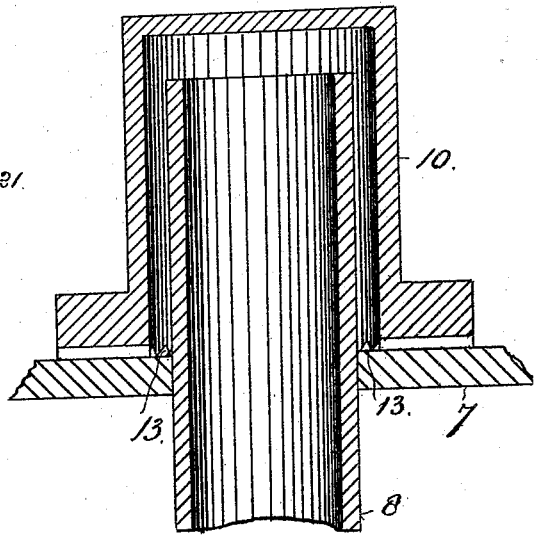

Figure 1 of the drawings is a longitudinal section taken through the still. Fig. 2 illustrates a detail of construction.

Similar reference characters indicating corresponding parts or elements in these views, let the numeral 5 designate the tank containing the aqua-ammonia, and 6 an upper tank or analyzer provided with pans 7, which carry open-ended pipes 8. In the case of the lowermost pan, the pipes 8 lead from tank 5 into chamber 9 and project above the bottom of the pans as illustrated in Fig. 2. The projecting extremities of these pipes are covered by caps 10, which are somewhat larger than the pipes and are notched or toothed as shown at 13 at the bottom to allow the forming of exit passages from the space inclosed by the cap. Each pan above is of the same construction, except that the uppermost is not provided with the caps 10. The pans are all provided with overflow pipes 12, projecting such a distance above the bottom of the pans, that before the liquid can escape from any pan to the one next below, it must be deep enough to seal the escape-apertures 13 leading from the interior of cap 10. The top of the overflow pipes must also occupy a plane lower than the highest plane reached by the pipes 8 belonging to the corresponding pan. The cold aqua-ammonia is introduced through a pipe 15 entering the analyzer 6 above the uppermost pan 7, and passes thence through the overflow pipes, from one pan to the other, until it reaches the tank 5. Hence the gas generated in the last named tank must pass through a seal of cold liquid in every pan 7 of the series below the uppermost, whereby the moisture and hydrocarbons are condensed as before stated. This condensing process may be supplemented by providing tank 6 with partitions 16, forming chambers 17 between the partitions and the pans, through which the gas exit-pipes 8 pass. These chambers 17 are entirely separated from the chambers 18 into which pipes 8 open, and are provided with inlet pipes 19 leading from a stand pipe 20 through which some cold liquid may be introduced to the chambers whereby pipes 8 are kept cool for the purpose of assisting in the condensation of the moisture in the gas. Chambers 17 are provided with outlets 21 leading from the upper part of the chambers to a discharge pipe 22, whereby the liquid may be kept continually changing. Branch pipes 21 are provided with valves for controlling the discharge of the liquid from the chambers. After being treated in tank 6, the pure dry gas passes off into pipe 23.

Having thus described our invention, what we claim is—

The process herein described of purifying ammonia gas, said process consisting in passing the gas under a pressure of nine to twelve atmospheres approximately, from the generating tank through a quantity of aqua ammonia at a temperature sufficiently low to remove by condensation the moisture and other impurities with which the gas is laden, the aqua ammonia containing such a per cent. of ammonia gas, say from twenty-nine per cent. to thirty-two per cent. by weight, that it has practically or approximately reached the limit of gas absorption, substantially as described.

In testimony whereof we affix our signatures in presence of two witnesses.

GEORGE L. VAIL.
THOMAS CHARLTON.

Witnesses:
BRINTON GREGORY,
CHAS. E. DAWSON.